(12) United States Patent
Kakizaki et al.

(10) Patent No.: US 7,767,333 B2
(45) Date of Patent: Aug. 3, 2010

(54) SEPARATOR FOR STORAGE BATTERY, STORAGE BATTERY AND METHOD OF PRODUCING STORAGE BATTERY

(75) Inventors: Yoshinobu Kakizaki, Gifu (JP); Takuo Mitani, Yamaguchi (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 577 days.

(21) Appl. No.: 10/545,804

(22) PCT Filed: Feb. 3, 2004

(86) PCT No.: PCT/JP2004/001030

§ 371 (c)(1),
(2), (4) Date: Aug. 16, 2005

(87) PCT Pub. No.: WO2004/075317

PCT Pub. Date: Sep. 2, 2004

(65) Prior Publication Data

US 2006/0172198 A1    Aug. 3, 2006

(30) Foreign Application Priority Data

Feb. 18, 2003    (JP) ............................. 2003-040277

(51) Int. Cl.
*H01M 2/16* (2006.01)
*H01M 6/02* (2006.01)
*H01M 6/22* (2006.01)

(52) U.S. Cl. ...................... 429/129; 429/142; 429/247; 429/251; 429/252; 29/623.1

(58) Field of Classification Search ................. 429/129, 429/142, 247, 248, 249, 251, 252
See application file for complete search history.

(56) References Cited

U.S. PATENT DOCUMENTS 3,997,366 A * 12/1976 Davis, Jr. .................... 429/144
4,820,575 A * 4/1989 Kolzer ......................... 442/76
5,091,275 A    2/1992 Brecht et al.
5,989,750 A * 11/1999 Ohba et al. ................. 429/251

FOREIGN PATENT DOCUMENTS

| EP | 814531 A2 | 12/1997 |
|----|-----------|---------|
| JP | 60-20463 | 2/1985 |
| JP | 7-122291 | 5/1995 |
| JP | 8-83624 | 3/1996 |
| JP | 11-260339 | 9/1999 |
| JP | 11-339752 | 12/1999 |

OTHER PUBLICATIONS

Complete Textile Glossary, Celanase Acetate, LLC. 2001. p. 158.*
The American Heritage Dictionary of the English Language [online]. [retrieved Feb. 20, 2008]. Retrieved from the internet: <URL:http://www.xreferplus.com/entry.jsp?xrefid=7142233&secid=.-&hh=1>.*
Supplementary European Search Report dated Apr. 1, 2008.

* cited by examiner

*Primary Examiner*—Patrick Ryan
*Assistant Examiner*—Alix Echelmeyer
(74) *Attorney, Agent, or Firm*—Kratz, Quintos & Hanson, LLP

(57) ABSTRACT

The separator for storage battery of the present invention is a separator for storage battery mainly composed of microfibrous glass and an expanded microcapsule which has been kept in shape with its shell rendered water-permeable by expansion is incorporated in the aforesaid microfibrous glass so that an electrolyte can be retained in the gap between the glass fibers and in the expanded microcapsule to provide a high electrolyte retention and allow the aforesaid expanded microcapsule to act as a cushioning material, whereby the separator is provided with an enhanced restoring force under pressure and is thus kept the adhesion to the electrode over an extended period of time, making it possible to attain the enhancement of the storage battery capacity and the prolongation of its life and apply only a low pressure to incorporate the electrode group in the battery case during assembly of storage battery.

12 Claims, No Drawings

SEPARATOR FOR STORAGE BATTERY, STORAGE BATTERY AND METHOD OF PRODUCING STORAGE BATTERY

TECHNICAL FIELD

The present invention relates to a separator for storage battery mainly composed of microfibrous glass, a storage battery comprising such a separator and a method of producing a storage battery.

BACKGROUND ART

A separator for storage battery such as a separator for valve regulated lead-acid battery is required to act as an insulating material that is interposed between a positive electrode and a negative electrode to separate the two electrodes from each other and act to retain an electrolyte. To this end, a storage battery is produced from a separator for storage battery mainly composed of ultrafine glass fibers which are excellent in acid resistance, oxidation resistance and hydrophilicity and have an average fiber diameter of from about 0.6 to 2 µm capable of increasing porosity. In a storage battery comprising a separator mainly composed of such microfibrous glass having a high electrolyte retention, when an electrolyte is injected into the battery case, the frictional force of the glass fibers with each other is reduced to cause the glass fibers to move, weakening the sheet structure and hence causing the pressure of the separator against the electrode to drop from that of the initial stage of assembly of storage battery. When the pressure runs short, the adhesion between the separator and the electrode deteriorates, making the reduction of battery capacity and life unavoidable. It is thus necessary in assembly of storage battery that an electrode group comprising a separator interposed between electrodes be previously pressed before being incorporated in the battery case so that the pressure can be kept as high as possible even after the injection of the electrolyte, and this was disadvantageous in that the pressure required for incorporation of electrode group in battery is as high as from 49 to 98 kPa, troubling the battery assembly and hence deteriorating productivity.

In order to cope with these problems, for example, JP-A-59-138059 and JP-A-7-122291 propose a storage battery which is arranged such that the electrode is pressed by the expansion of a separator caused by heating, taking into account the fact that when subjected to repeated cycle of charge and discharge, the positive electrode of a storage battery expands and shrinks to undergo volumetric change that makes the bond of particles of active material constituting the positive electrode each other relax, atomizes and softens the particles and causes the particles to be exfoliative.

Referring to the storage batteries proposed in the above cited patent references, a valve regulated lead-acid battery is produced by putting an electrode group comprising a separator interposed between a positive electrode and a negative electrode in a battery case, heating the assembly to allow the hollow body in the separator to expand so that a pressure is applied to the positive electrode, and then injecting an electrolyte into the battery case.

However, in the case where a separator as proposed in the above cited patent references is used, it is certain that the problem of reduction of productivity of battery assembly due to the rise of the pressure required to incorporate the electrode group in battery as seen with the aforesaid conventional separator mainly composed of glass fibers alone and storage battery can be solved, but the incorporation of a minute hollow body in the gap between the glass fibers which are a main component of the separator causes the reduction of the porosity of the separator and hence the deterioration of the electrolyte retention, i.e., wicking ability or wicking volume of the separator.

Therefore, an object of the present invention is to provide a separator for storage battery mainly composed of microfibrous glass capable of enhancing productivity of battery assembly without deteriorating electrolyte retention, a storage battery comprising the aforesaid separator and a method of producing the same in order to eliminate the disadvantages of the above cited patent references.

DISCLOSURE OF THE INVENTION

In order to accomplish the aforesaid object, in a first embodiment of the invention, the separator for storage battery of the present invention is a separator for storage battery mainly composed of microfibrous glass, characterized in that an expandable microcapsule is incorporated in the microfibrous glass and then expanded, or an expandable microcapsule is previously expanded and then incorporated in the microfibrous glass, so that an expanded microcapsule kept in shape with its shell rendered water-permeable by expansion is incorporated in the microfibrous glass.

Further, in a second embodiment of the invention, a separator for storage battery concerns a separator for storage battery of the first embodiment, wherein the microcapsule is made of an acid-resistant thermoplastic resin.

Further, in a third embodiment of the invention, the separator for storage battery concerns a separator for storage battery of the second embodiment, wherein the microcapsule is made of a polyacrylonitrile-based resin.

In order to accomplish the aforesaid object, in a fourth embodiment of the invention, the separator for storage battery of the present invention is a separator for storage battery mainly composed of microfibrous glass, characterized in that an expandable microcapsule which can be kept in shape while rendering its shell water-permeable by expansion is incorporated in the microfibrous glass.

Further, in a fifth embodiment of the invention, the separator for storage battery concerns a separator for storage battery of the fourth embodiment, wherein the microcapsule is made of an acid-resistant thermoplastic resin.

Further, in a sixth embodiment of the invention, the separator for storage battery concerns a separator for storage battery of the fifth embodiment, wherein the microcapsule is made of a polyacrylonitrile-based resin.

Further, in order to accomplish the aforesaid object, the storage battery of a seventh embodiment of the present invention comprises an electrode group with a separator described in any one of the first to third embodiments interposed between electrodes.

Further, in order to accomplish the aforesaid object, an eighth embodiment of the invention is a method of producing a storage battery comprising disposing a separator mainly composed of microfibrous glass having an expandable microcapsule incorporated therein interposed between a positive electrode and a negative electrode to form an electrode group, putting the electrode group in a battery case, and then allowing the microcapsule to expand before or after the injection of an electrolyte to render the shell water-permeable.

BEST MODE FOR CARRYING OUT THE INVENTION

Next, the separator for storage battery of the present invention, the storage battery and the method of producing the same will be described.

As the microfibrous glass which is a main component of the separator, there is used, e.g., one having an average fiber diameter of from 0.2 to 2 μm obtained by melting acid-resistant C glass, spinning the molten glass, and then blowing the glass thus spun with an energy of burner flame.

Further, as the unexpanded expandable microcapsule to be incorporated in the aforesaid microfibrous glass, there is used one having a structure having an electrolyte resistance (acid resistance) and incorporating in a capsule, i.e., shell an expandable material which expands when it is heated or comes in contact with an electrolyte or otherwise, e.g., low boiling hydrocarbon. Further, as the expandable material to be incorporated in the expandable microcapsule, there is selected one which has no adverse effects on the properties of the electrolyte, etc. even when it leaks out of the capsule.

Further, the size of the unexpanded expandable microcapsule, is not greater than several tens of micrometers as calculated in terms of diameter, taking into account the uniformity in dispersion during paper making.

As the material of the shell of the aforesaid unexpanded expandable microcapsule or expanded microcapsule, there is selected one having an electrolyte resistance which exhibits a strength such that it can keep in shape even after expansion. In particular, in the present invention, it is necessary that the shell of the expanded microcapsule be rendered water-permeable, and in this case, it is necessary that the shell keep in shape while being rendered water-permeable. Examples of the material that can meet these requirements include expandable thermoplastic polyethylene-based, polyolefin-based and polyacrylonitrile-based materials, but polyacrylonitrile-based materials are preferred because they have an excellent acid resistance and little gas permeation that allows the shell to fairly keep in shape.

The content of the aforesaid unexpanded expandable microcapsule or expanded microcapsule preferably falls within a range of from 1 to 70% by weight for the sake of sheet formation. It is more desirable particularly when the content is from 1 to 10% by weight. This is because when overheated, a thermoplastic microcapsule forms a film that inhibits the hydrophilicity of the separator, possibly causing the rise of electrical resistance or the drop of wicking ability.

The separator of the present invention can be produced, e.g., by the following method.

(1) To add a predetermined amount of an unexpanded expandable microcapsule to a microfibrous glass as a main component and then subject the mixture to uniform dispersion/mixing in water by a separator such as mixer and pulper.
(2) To add a proper amount of a cationic adsorbent, e.g., polyacrylamide-based adsorbent to the mixture thus uniformly dispersed/mixed so that the expandable microcapsule is adsorbed to and supported on the glass fibers.
(3) To form the paper seed thus obtained into sheet by a cylinder paper machine, wire paper machine or inclined paper machine.
(4) To dry the sheet to obtain a raw sheet.

The raw sheet thus obtained can be incorporated as a separator in a battery, but in the case where an unexpanded expandable microcapsule which expands when it is heated is incorporated therein as it is, the expandable microcapsule may be allowed to expand before being incorporated in the battery while the shell thereof being rendered water-permeable to obtain a separator incorporating a low density expanded microcapsule which is then incorporated in the battery. In this case, the high cushioning properties of the separator incorporating an expanded microcapsule makes it possible to easily reduce the thickness of the separator even under a low pressure and hence easily perform battery assembly without requiring a high pressure as in the related art.

On the other hand, in the case where the separator is incorporated in the battery with the expandable microcapsule left unexpanded, the expandable microcapsule may be allowed to expand after being incorporated in the battery so that a predetermined pressure is obtained, making it unnecessary to apply any pressure during battery assembly and hence making it extremely easy to assemble a battery. The separator thus incorporated in the battery is subjected to treatment such as heating before the injection of the electrolyte so that the expandable microcapsule expands to render the shell thereof water-permeable, causing the thickness of the separator to rise and hence giving a predetermined pressure. In this case, the pressure can be arbitrarily adjusted by the expansion force and added amount of the expandable microcapsule, the treatment temperature, the amount of the expandable material to be incorporated, etc. However, the condition of the expanded microcapsule is needed to keep its shell water-permeable, but the shell must not be ruptured or destroyed. As the method of allowing the expandable microcapsule to expand, there may be also proposed a method which comprises incorporating a reactive material reactive with sulfuric acid in the electrolyte such as sodium bicarbonate so that the expandable microcapsule expands at the same time with or after the injection of the electrolyte, besides the aforementioned heating method. This method is advantageous in that the aforementioned heat treatment is not needed but is disadvantageous in that it is necessary to inject the electrolyte that increases the amount of the sulfuric acid consumed for the reaction.

By the way, referring to the condition of the separator after the expansion of the expandable microcapsule, it is desirable that essentially the whole of the expanded microcapsules incorporated in the separator keep in shape while its shell being rendered water-permeable by expansion, but since it is difficult to perform such a control completely, for example the whole of the expanded microcapsules may comprise some expanded microcapsules the shell of which have not been rendered water-permeable even by expansion or some expanded microcapsules which have been ruptured or destroyed because they could not keep in shape after expansion. Further, referring to the water permeability given to the shell by the expansion of the expandable microcapsule, it is not necessarily required that the entire shell be water-permeable, but there may be left some regions having no water permeability.

EXAMPLE

Next, specific examples of the present invention will be described in detail with related art examples, but the present invention is not limited thereto.

Example 1

95% by weight of glass fibers having an average fiber diameter of 0.7 μm and 5% by weight of "Matsumoto Microsphere F-55" produced by Matsumoto Yushi-Seiyaku Co., Ltd., as a thermally expandable microcapsule powder made of polyacrylonitrile-based resin were dispersed and mixed in water. To the mixture was then added an acrylamide-based adsorbent so that the expandable microcapsule was adsorbed to and supported on the glass fibers. Using an ordinary paper machine, the mixture was formed into a sheet which was then dried at 95° C. to obtain a separator sheet.

Example 2

90% by weight of glass fibers having an average fiber diameter of 0.7 μm and 10% by weight of "Matsumoto Microsphere F-55" produced by Matsumoto Yushi-Seiyaku Co., Ltd., as a thermally expandable microcapsule powder made of polyacrylonitrile-based resin were dispersed and mixed in water. To the mixture was then added an acrylamide-based adsorbent so that the expandable microcapsule was adsorbed to and supported on the glass fibers. Using an ordinary paper machine, the mixture was formed into a sheet which was then dried at 95° C. to obtain a separator sheet.

Example 3

80% by weight of glass fibers having an average fiber diameter of 0.7 μm and 20% by weight of "Matsumoto Microsphere F-55" produced by Matsumoto Yushi-Seiyaku Co., Ltd., as a thermally expandable microcapsule powder made of polyacrylonitrile-based resin were dispersed and mixed in water. To the mixture was then added an acrylamide-based adsorbent so that the expandable microcapsule was adsorbed to and supported on the glass fibers. Using an ordinary paper machine, the mixture was formed into a sheet which was then dried at 95° C. to obtain a separator sheet.

Example 4

50% by weight of glass fibers having an average fiber diameter of 0.7 μm and 50% by weight of "Matsumoto Microsphere F-55" produced by Matsumoto Yushi-Seiyaku Co., Ltd., as a thermally expandable microcapsule powder made of polyacrylonitrile-based resin were dispersed and mixed in water. To the mixture was then added an acrylamide-based adsorbent so that the expandable microcapsule was adsorbed to and supported on the glass fibers. Using an ordinary paper machine, the mixture was formed into a sheet which was then dried at 95° C. to obtain a separator sheet.

Subsequently, the separators of Examples 1 to 4 thus obtained were each incorporated in a 6M4 (abbreviation of 6V4Ah) battery under no pressure. Thereafter, the aforesaid battery was subjected to heat treatment at 120° C. so that the expandable microcapsule in the separator was allowed to expand, rendering the shell of the expanded microcapsule water-permeable while increasing the thickness of the separator to apply a predetermined pressure to the electrode group. Thereafter, an electrolyte was injected into the battery to obtain a valve regulated lead-acid battery.

Conventional Example

100% by weight of glass fibers having an average fiber diameter of 0.7 μm was dispersed in water, and then formed by an ordinary paper machine into a sheet which was then dried at 95° C. to obtain a separator sheet.

Subsequently, the conventional separator thus obtained was incorporated in a 6M4 battery under an initial pressure of 19.6 kPa. Thereafter, an electrolyte was injected into the battery to obtain a valve regulated lead-acid battery.

Subsequently, the separators of Examples 1 to 4 and conventional Example thus obtained and the batteries comprising these separators were measured for separator properties and battery properties. The results are set forth in Table 1.

TABLE 1

| | Item | Unit | Example 1 | Example 2 | Example 3 | Example 4 | Conventional Example 1 |
|---|---|---|---|---|---|---|---|
| Material compounding | Glass fibers (0.7 μm) | wt-% | 95 | 90 | 80 | 50 | 100 |
| | Microcapsule | wt-% | 5 | 10 | 20 | 50 | — |
| Material cost | | — | 80 | 80 | 80 | 80 | 100 |
| Separator properties | Initial thickness | mm | 0.78 | 0.78 | 0.55 | 0.21 | 1.05 |
| | Thickness after expanded | mm | 1.05 | 1.08 | 1.05 | 1.05 | — |
| | Grammage | g/m$^2$ | 102 | 95 | 68 | 55 | 150 |
| | Density | g/cm$^3$ | 0.097 | 0.086 | 0.065 | 0.052 | 0.150 |
| | Maximum pore diameter | μm | 19.0 | 19.0 | 20.5 | 23.0 | 19.1 |
| | Cushioning properties | % | 58 | 55 | 52 | 45 | 70 |
| | Wicking volume | % | 92 | 93 | 93 | 94 | 88 |
| Battery properties | Battery pressure Initial | kPa | 0 | 0 | 0 | 0 | 19.6 |
| | During electrolyte injection/expansion | kPa | 20.2 | 21.6 | 19.6 | 19.6 | 11.8 |
| | Cycle life | — | 120 | 120 | 130 | 130 | 100 |

Note 1)
Cost: Relative to that of Conventional Example 1 as 100
Note 2)
Cushioning properties: (Thickness under pressure of 98 kPa/thickness under pressure of 19.6 kPa) × 100
Note 3)
Cycle life: A cycle life test was conducted with 2 hours of charge at 1 A and 6 hours of discharge at 0.4 A as one cycle. The lifetime was judged when the capacity fell below 50% of the nominal capacity after discharging to 5.1 V at 1 A. The figure indicates the value relative to that of Conventional Example 1 as 100.
Note 4)
For the evaluation of the separator properties of Examples 1 to 4 except the initial thickness, the sheet after expansion was examined.

As can be seen in Table 1, the separators of Examples 1 to 4 are separators comprising an expandable microcapsule incorporated therein and thus can attain the reduction of density, making it possible to reduce the material cost by 20% from that of the conventional example. Further, the grammage could be reduced by from 32 to 63% from the conventional example, making it possible to attain the enhancement of paper making speed and the drastic reduction of drying energy during production. Moreover, by rendering the shell of the expandable microcapsule water-permeable by expansion, the electrolyte can be retained also in the expanded microcapsule, making it possible to raise the wicking volume by from 5 to 7% from that of the conventional example.

Further, when it is attempted to reduce the density by the material constitution of the conventional example, i.e., constitution comprising glass fibers alone, there is formed a sheet having a coarse structure and hence raised maximum pore diameter that can easily cause the stratification of the electrolyte leading to the drop of the battery capacity, that is, the reduction of the life of the battery, but the separators of Examples 1 to 4 have the gap between fibers filled with expanded microcapsules, making it possible to inhibit the rise of pore diameter as much as possible despite its reduced density.

Moreover, the batteries comprising the separators of Examples 1 to 4 showed a cycle life rise of from 20 to 30% as compared with the battery comprising the separator of the conventional example. This is presumably because the battery comprising the separator of the conventional example possesses an initial battery pressure of 19.6 kPa but exhibits a drop to 11.8 pKa after the injection of the electrolyte and a low separator restoring force after pressurized and thus gradually loses adhesion to the electrode with time and reduces its life. On the contrary, in the batteries comprising the separators of Examples 1 to 4, the expanded microcapsule acts as a cushioning material to provide the separator with a high restoring force under pressure, causing little or no pressure drop after the injection of the electrolyte, making it possible to maintain the adhesion to the electrode over an extended period of time and hence resulting in the prolongation of life.

By the way, when a separator sheet comprising an expanded microcapsule incorporated therein which is kept in shape with its shell rendered water-permeable was produced from the same materials as used in the aforesaid examples by previously allowing an expandable microcapsule to expand, and then incorporating the expanded microcapsule in microfibrous glass, the separator could be provided with a reduced density and an enhanced wicking volume and prevent itself from having an increased pore diameter as in the aforesaid examples. Further, when a separator sheet comprising an expanded microcapsule incorporated therein which is kept in shape with its shell rendered water-permeable was produced from the same materials as used in the aforesaid examples by forming a sheet comprising an expandable microcapsule incorporated in the aforesaid microfibrous glass, and then heating the aforesaid sheet so that the aforesaid expandable microcapsule is allowed to expand before being incorporated in the battery, the separator could be provided with a reduced density and an enhanced wicking volume and prevent itself from having an increased pore diameter as in the aforesaid examples. Moreover, the valve regulated lead-acid battery produced by incorporating the aforesaid various separator sheets in the battery, and then injecting the electrolyte in the battery could be provided with a prolonged cycle life as in the aforesaid examples.

INDUSTRIAL APPLICABILITY

In accordance with the separator for storage battery of the present invention, since the electrolyte can be retained in the gap between the microfibrous glass which are a main component in the battery case and the electrolyte can be absorbed also in the inside of the expanded microcapsule through the shell which has been rendered water-permeable by the expansion of the expandable microcapsule, a high electrolyte retention can be provided despite the structure comprising the gap between the fibers filled with expanded microcapsules as hollow body.

Further, in accordance with the separator for storage battery of the present invention, since the expanded microcapsule incorporated in the separator can be kept in shape with its shell rendered water-permeable by expansion in the battery case, the expanded microcapsule acts as a cushioning material to provide the separator with a high restoring force under pressure, causing little or no pressure drop after the injection of the electrolyte and hence making it possible to maintain the adhesion to the electrode over an extended period of time and attain the enhancement of the storage battery capacity and the prolongation of its life.

Moreover, since the electrode group can be incorporated in the battery case under no or only a low pressure during assembly of storage battery, the battery can be easily assembled, enhancing the productivity.

Further, by incorporating an expandable microcapsule or expanded microcapsule in microfibrous glass, the amount of expensive microfibrous glass to be used in the separator can be reduced, making it possible to reduce the production cost.

The invention claimed is:

1. A separator for storage battery mainly composed of microfibrous glass of average fiber diameter 0.2 to 2 μm, characterized in that an expandable microcapsule is incorporated in said microfibrous glass and then expanded, or an expandable microcapsule is previously expanded and then incorporated in said microfibrous glass, so that an expanded microcapsule kept in shape with its shell rendered water-permeable by expansion is incorporated in said microfibrous glass.

2. The separator for storage battery as described in claim 1, wherein said microcapsule is made of an acid-resistant thermoplastic resin.

3. The separator for storage battery as described in claim 2, wherein said microcapsule is made of a polyacrylonitrile-based resin.

4. A separator for storage battery mainly composed of microfibrous glass of average fiber diameter 0.2 to 2 μm, characterized in that an expandable microcapsule which can be kept in shape while rendering its shell water-permeable by expansion is incorporated in said microfibrous glass.

5. The separator for storage battery as described in claim 4, wherein said microcapsule is made of an acid-resistant thermoplastic resin.

6. The separator for storage battery as described in claim 5, wherein said microcapsule is made of a polyacrylonitrile-based resin.

7. A storage battery comprising an electrode group with a separator interposed between a positive electrode and a negative electrode,
    wherein said separator for storage battery is mainly composed of microfibrous glass of average fiber diameter 0.2 to 2 μm, and is characterized in that an expandable microcapsule is incorporated in said microfibrous glass and then expanded, or an expandable microcapsule is previously expanded and then incorporated in said microfibrous glass, so that an expanded microcapsule kept in shape with its shell rendered water-permeable by expansion is incorporated in said microfibrous glass.

8. A method of producing a storage battery which comprises disposing a separator mainly composed of microfibrous glass of average fiber diameter 0.2 to 2 μm having an expandable microcapsule incorporated therein interposed between a positive electrode and a negative electrode to form an electrode group, putting said electrode group in a battery case, and then allowing said expandable microcapsule to expand before or after the injection of an electrolyte to render the shell water-permeable.

9. The separator for storage battery of claim 1, wherein the content of said expandable microcapsule in the separator is 1 to 70% by weight.

10. The separator for storage battery of claim 9, wherein the content of said expandable microcapsule in the separator is 1 to 10% by weight.

11. The storage battery of claim 7, wherein said microcapsule is made of an acid-resistant thermoplastic resin.

12. The storage battery of claim 7, wherein said microcapsule is made of a polyacrylonitrile-based resin.

* * * * *